US012538117B2

(12) United States Patent
Balasubramanian et al.

(10) Patent No.: US 12,538,117 B2
(45) Date of Patent: Jan. 27, 2026

(54) METHOD AND APPARATUS FOR ENTERPRISE CREDENTIAL IDENTIFICATION

(71) Applicants: Celona, Inc., Cupertino, CA (US); Giesecke+Devrient Mobile Security America, Inc., Dulles, VA (US)

(72) Inventors: Srinivasan Balasubramanian, San Diego, CA (US); Hemant Udhavrao Borase, Livermore, CA (US)

(73) Assignees: Celona, Inc., Campbell, CA (US); Giesecke+Devrient Mobile Security America, Inc., Dulles, VA (US)

( * ) Notice: Subject to any disclaimer, the term of this patent is extended or adjusted under 35 U.S.C. 154(b) by 453 days.

(21) Appl. No.: 17/874,679

(22) Filed: Jul. 27, 2022

(65) Prior Publication Data

US 2023/0048624 A1    Feb. 16, 2023

Related U.S. Application Data

(60) Provisional application No. 63/226,112, filed on Jul. 27, 2021.

(51) Int. Cl.
*H04W 8/20* (2009.01)
*H04W 8/18* (2009.01)
(Continued)

(52) U.S. Cl.
CPC ........... *H04W 8/205* (2013.01); *H04W 8/183* (2013.01); *H04W 12/06* (2013.01)

(58) Field of Classification Search
CPC ..... H04W 8/205; H04W 8/183; H04W 12/06; H04W 12/35; H04W 12/72; H04W 12/76
See application file for complete search history.

(56) References Cited

U.S. PATENT DOCUMENTS

| 2008/0096555 A1* | 4/2008 | Herrmann | H04W 8/265 |
| | | | 455/435.1 |
| 2009/0270092 A1* | 10/2009 | Buckley | H04W 48/20 |
| | | | 455/434 |

(Continued)

FOREIGN PATENT DOCUMENTS

| WO | 2020247043 | 12/2020 | |
| WO | WO-2020247043 A1 * | 12/2020 | ............ H04W 48/18 |

OTHER PUBLICATIONS

Rodriguez, Kari, International Search Report and Written Opinion received from the USRO dated Mar. 15, 2023 for appln. No. PCT/US2022/038474, 167 pgs.

(Continued)

*Primary Examiner* — Joseph E Dean, Jr.
(74) *Attorney, Agent, or Firm* — Jaquez Land Greenhaus & McFarland, LLP; Bruce W. Greenhaus (57) ABSTRACT

A method is disclosed in which a defined vendor specific extension is used to store an enterprise network identifier within a subscriber identity module (SIM). The use of the vendor specific extension makes it easier to provision a SIM (Subscriber Identity Module) profile with an enterprise identifier. The vendor specific extension allows the high level operating system (HLOS) of a UE (User Equipment) to obtain an enterprise identifier without impacting the baseband implementation of the UE. The same enterprise identification can be reused in equipment of both 4th Generation Long Term Evolution (LTE) and 5th Generation New Radio (NR) networks.

11 Claims, 4 Drawing Sheets

(51) Int. Cl.
*H04W 12/06* (2021.01)
*H04W 12/30* (2021.01)

(56) References Cited

U.S. PATENT DOCUMENTS

2016/0134624 A1* 5/2016 Jacobson ............... H04W 4/02
  726/4
2020/0235952 A1* 7/2020 Mukherjee .......... H04L 41/5019

OTHER PUBLICATIONS

Boire, Sebastien, "Credential Provisioning and Peer Configuration with Extensible Authentication Protocol", May 14, 2021, https://aaltodoc.aalto.fi/bitstream/handle/123456789/108221/master_Boire_S%C3%A9bastien_2021.pdf?sequence=1&isAllowed=y.

Fridh, Albin, "eSIM Re-Selling on Mobile App", 2020, https://lup.lub.lu.sa/luur/download?func=downloadFile&recordOId=9015242&fileOId=9017063.

* cited by examiner

METHOD AND APPARATUS FOR ENTERPRISE CREDENTIAL IDENTIFICATION

CROSS-REFERENCE TO RELATED APPLICATIONS—CLAIMS OF PRIORITY

This utility application claims priority under 35 USC section 111 (b) and under 35 USC section 119 (e), to earlier-filed provisional application No. 63/226,112 filed Jul. 27, 2021, entitled "Method and Apparatus for Enterprise Credential Identification"; and the contents of the above-cited earlier-filed provisional application (App. No.: 63/226,112) are hereby incorporated by reference herein as if set forth in full.

BACKGROUND

(1) Technical Field

The disclosed method and apparatus relate generally to enterprise networks and more particularly, the disclosed method and apparatus relates to provisioning an enterprise identifier within user equipment of an enterprise network.

(2) Background

Figure 1:
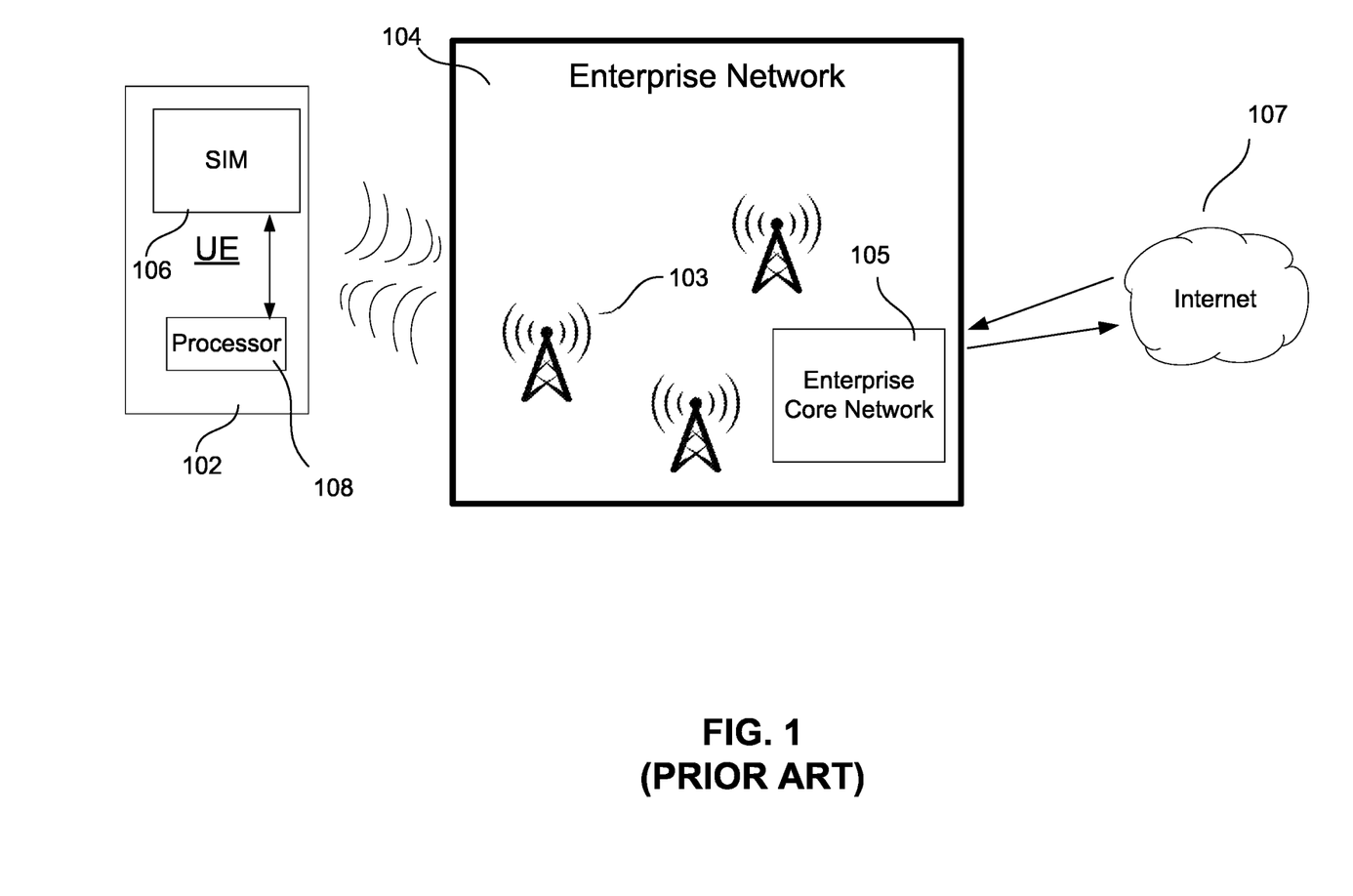
FIG. 1 is an illustration of a UE (user equipment) in communication with an enterprise network.

FIG. 1 is an illustration of a UE (user equipment) 102 in communication with an enterprise network 104. The UE has a subscriber identification module (SIM) 106. When the UE 102 attempts to attain services from an enterprise network 104, it is necessary to identify the enterprise network 104 and to ensure that the UE 102 has the required credentials to allow the UE 102 to access the resources of the enterprise network 104. Authentication is typically done by an enterprise core network 105. The credentials must be identified within the SIM 106 in the UE 102. Furthermore, an enterprise identifier must be provided that uniquely identifies the network 106 for which the credentials are valid.

Typically, if the UE 102 is a subscriber to an MNO (mobile network operator), the MNO issues a SIM 106 to be used in the UE 102. SIM 106 holds information used for authentication as well as other information regarding a user of the UE 102 and the associated user's subscription. In most cases, the SIM 106 is an embedded integrated circuit component within the UE 102. The SIM 106 securely stores an IMSI (international mobile subscriber identity) together with a key that is used to identify and authenticate the subscriber. The UE 102 may be a cell phones, tablet, computer, TOT device, etc. Other information may also be stored on the SIM 106, such as an address book, text messages, network names, or other carrier or subscriber information. A processor 108 within the UE 102 can read this information from the SIM 106.

However, when a UE 106 is attempting to gain access to the resources of an enterprise network 104, alternative methods are required to identify the enterprise network 104 and authenticate the UE's authority to access the enterprise network resources. In LTE networks, a CSG-ID (Closed Subscriber Group ID) may be used as the enterprise identifier. The CSG-ID is populated in an enterprise SIM profile and used to identify the enterprise credential. However, this requires specific baseband interactions to obtain the identifier. Accordingly, it would be advantageous if there were a method and associated apparatus that allows easy and secure provisioning of enterprise identifiers within UEs without the need for the baseband interactions that are required when using the CSG-ID as the enterprise identifier.

SUMMARY

A vendor specific extension can be used to make it easier to provision the SIM (Subscriber Identity Module) profile with an enterprise identifier. In addition, use of the vendor specific extension allows the high level operating system (HLOS) of a UE (User Equipment) to obtain an enterprise identifier without impacting the baseband implementation of the UE. That is, there is no need to get down to the lower levels of operation of the UE to determine the information regarding the particular enterprise network for which the UE is to be provisioned. Furthermore, the same enterprise identification can be reused in equipment of both $4^{th}$ Generation Long Term Evolution (LTE) and $5^{th}$ Generation New Radio (NR) networks.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The disclosed method and the apparatus disclosed herein uses a vendor specific extension format and protocol outlined in a well-known GSMA industry specification to store an enterprise identifier that identifies the enterprise networks and additional information related to the particular enterprise networks. The GSM Association (commonly referred to as 'the GSMA' or Global System for Mobile Communications, originally Groupe Spécial Mobile) is an industry organization that represents the interests of mobile network operators worldwide.

The vendor specification extension is currently open to be used to allow storage of any particular data desired in a SIM. Using the vendor specific extension to store enterprise identification information reduces the complexity required to provision the SIM (Subscriber Identity Module) profile with an enterprise identifier. In addition, use of the vendor specific extension allows the UE (User Equipment) high level operating system (HLOS) to obtain the enterprise identifier without impacting the baseband implementation. That is, there is no need to get down to the lower levels of operation to determine the information regarding the particular enterprise network for which the UE is to be provisioned. Furthermore, the same enterprise identification can be reused by both $4^{th}$ LTE (Generation Long Term Evolution) and $5^{th}$ Generation NR (New Radio) networks.

In some embodiments, in which there is no provision for such a vendor specific extension, such as some legacy systems, the CSG-ID (Closed Subscriber Group ID) is used as the network identifier. That is, the SIM is provisioned with the CSG-ID having a value that identifies the particular enterprise network. In some embodiments of the disclosed method and apparatus in which the vendor specific extension is used, the vendor specific extension provides the enterprise identifier together with, or as an alternative to the having the CSG-ID as the means by which the enterprise identifier association is performed. That is, using the vendor specific extension as a means for enterprise identifier association can be used in both 4G LTE and 5G NR systems. In some embodiments, when there are no legacy systems that rely upon the CSG-ID method for defining the enterprise identifier association, CSG-ID provisioning can be phased out.

Figure 2:
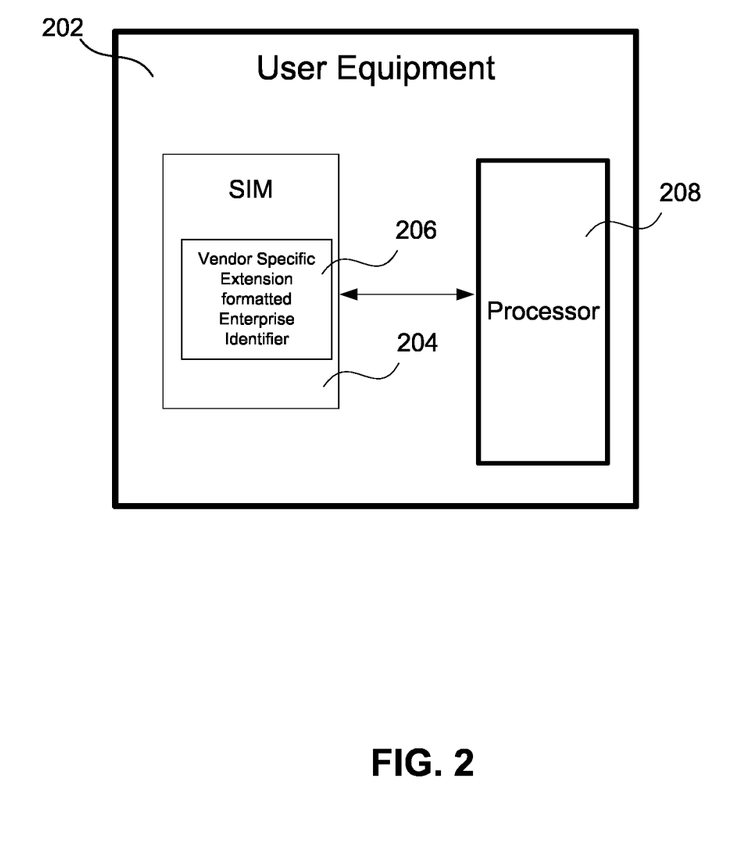
FIG. 2 is an illustration of a UE having a SIM with vendor specific extension formatted enterprise identifier information stored therein.

FIG. 2 is an illustration of a UE 202 having a SIM 204 in which an enterprise identifier 206 is stored by a processor 208. The enterprise identifier 206 is formatted in accordance with a protocol defined for a vendor specific extension provided for by GSMA specifications. In some embodiments, an enterprise identifier can be obtained from a standards organization or central organization, such as the OnGo Alliance. Such an organization can ensure the uniqueness of the identifier when an SHNI (shared home network identifier) is being used as the PLMN ID (Public Land Mobile Network Identifier). In some embodiments, the identifier provided by such an organization is stored as the CSG-ID within 4G LTE networks and as a NID (network identifier) (bit aligned by adding the required number of leading zeros) for use in 5G NR networks.

Figure 3:
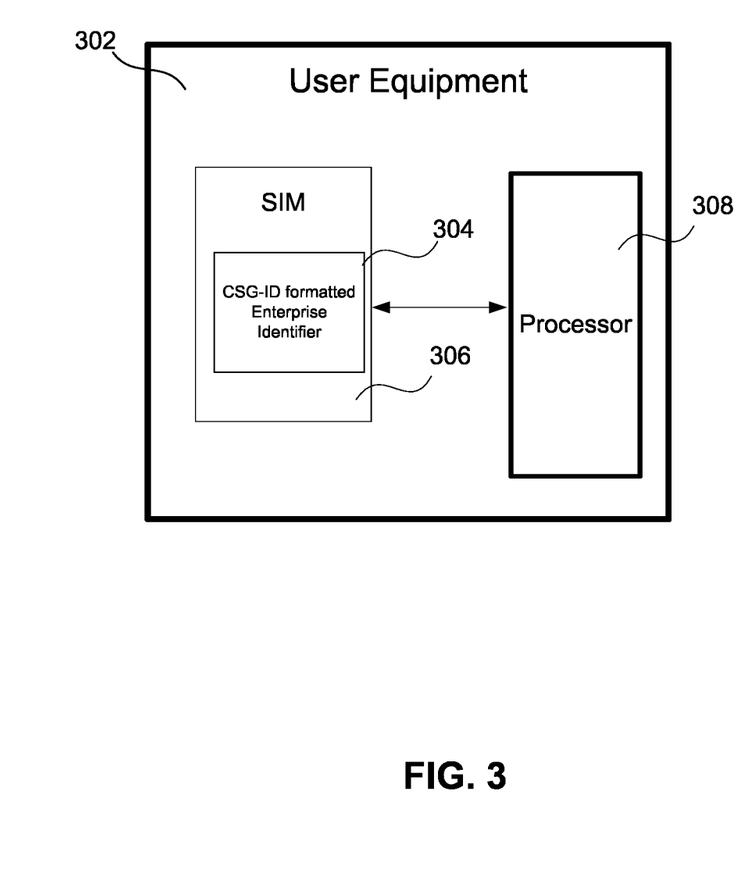
FIG. 3 is an illustration of a UE in which the CSG-ID is used to store the enterprise identifier within the SIM by a processor.

FIG. 3 is an illustration of a UE 302 in which the CSG-ID is used to store the enterprise identifier 304 within the SIM 306 by a processor 308.

Figure 4:
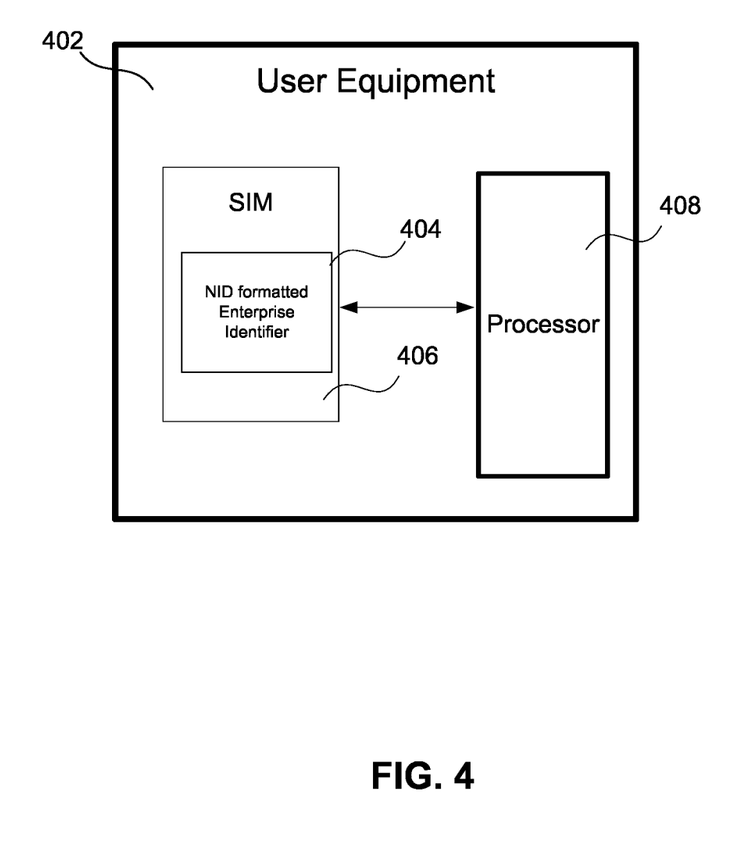
FIG. 4 is an illustration of a UE in which the NID is used to store the enterprise identifier within the SIM by a processor.

FIG. 4 is an illustration of a UE 402 in which the NID is used to store the enterprise identifier 404 within the SIM 406 by a processor 408.

An SNPN (Stand-alone Non-Public Network) for NR networks can be deployed as either a true stand-alone network or as a PNI-NPN (Public Network Integrated-Non-Public Network). An SNPN is identified by a combination of a PLMN ID and a NID. In some embodiments, the NID is self-assigned, and therefore may not be unique. Alternatively, the NID is coordinated to ensure that it is unique upon being assigned and that it remains unique. In some embodiments, the NID for a 5G NR network can either be defined by the organization assigning it as a globally unique value or as a value that is only unique when combined with a PLMN ID. In the case in which the NID is only unique when combined with the PLMN ID, the same NID will not be reused within a PLMN. In some embodiments, the NID is—a—globally unique standing alone and the NID is obtained from an IMSI-A (International Mobile Subscriber Identifier Administrator). In the alternative, in embodiments in which the NID is merely unique within the PLMN, the NID is managed by entities within the particular PLMN. In the particular embodiment in which the PLMN is an SHNI, the entity that is responsible for that particular SHNI (such as the OnGo-A for the SHNI associated with the OnGo Alliance) can provide a network identifier that can be used across both 4G LTE and 5G NR networks.

In an SNPN, the combination of a PLMN ID and—an—NID—from—the network identifier, which is broadcast by the SNPN radio access network (RAN). Broadcast of the identifier enables network selection and reselection, overload control—and—access control—,—and barring each of which—,—are supported by using the PLMN ID and NID. A UE has the ability to obtain PLMN services while camping on an SNPN RAN, when the UE has a subscription and credentials to obtain services from both—the—PLMN and—the—SNPN.

In a Public Network Integrated NPN, a PLMN ID identifies the network. In addition, a Closed Access Group (CAG) ID identifies cells within the CAG. A CAG cell broadcasts one or more CAG IDs per PLMN. Network selection and reselection is based on PLMN ID. Cell selection and reselection, and access control are based on the CAG ID. The CAG cell broadcasts information such that only UEs supporting the CAG can access the cell. The CAGs are managed by the enterprise and MNO(s) working together to provide the PNI-NPN deployment. A UE can determine whether a network is an SNPN or PNI-NPN based on the subscription used to camp onto the enterprise network.

In some embodiments, an OID (Object Identifier) field is populated with a value that allows a UE to recognize the type of information specified in the vendor specific extension. In embodiments intended for world-wide deployment, UE implementations recognize the OID used for associating enterprise deployment credentials (i.e., provisioning enterprise identifiers). In some embodiments, a unique OID is defined by the GSMA. Alternatively, individual SIM suppliers each obtain their own OIDs indicating use of the vendor specific extension for provisioning of enterprise identifiers. In some embodiments, identifying these OIDs as indicating that the vendor specific extension is being used for provisioning of the enterprise identifier is done by providing the associated OID to the UE partners for implementation within the UEs. It should be noted that in embodiments that use of the vendor specific extension, both physical SIMs, as well as embedded SIMs should support such use. That is, traditionally, SIMs contained a single subscriber identity profile containing subscription information for a single user subscription plan for a single carrier. A user wishing to communicate via different carriers or networks or switch between wireless subscriptions on a single device could only do so by replacing a SIM with a corresponding SIM for the desired subscription plan. These are often called Physical SIMs which come in various form factors.

Recently, however, SIMs are being designed to accommodate multiple operator profiles on a single SIM. These SIMs are designed with a "container" for each operator profile and have a dedicated set of commands (e.g., a "toolkit") for interoperating between the carrier and the UE. These SIMs usually have a small form factor and are soldered on a device board. The SIM may also have an eUICC (embedded Universal Integrated Circuit Card). The eUICC is a component of a SIM that allows and simplifies switching MNOs Over-the-Air (OTA). This technology simplifies global deployment and mobile machine-to-machine applications. In some embodiments, regardless of the type of SIM used in a particular UE, the use of the vendor specific extension for provisioning the enterprise identifiers is supported.

In some embodiments, an LPA (Local Profile Assistant) application hosted on UE (such as is described in industry specifications provided by the GSMA) should execute a routine (such as the GetProfilesinfo function described in GSMA technical specification SGP.22) to fetch metadata information about an eSIM (embedded SIM) in the UE. The LPA is part of the consumer device architecture specified by the GSMA. It is usually implemented as an application on a consumer device, such as a smartphone, a tablet, or a smart watch. The LPA allows an end-user to choose and change the subscription data for switching to a different mobile network operator. In some embodiments, upon detection of a vendor specific extension, the LPA parses and passes information to the appropriate UE component for further processing of a NID, such as a CBRS (Citizen Band Radio Service) NID, Enterprise Name and additional data related to the enterprise.

In some embodiments, eSIM metadata is used when the UE does not support the use of an eUICC. For example, eSIM metadata is used when the UE has a pluggable SIM that does not support RSP (Remote SIM Provisioning) as described in the GSMA industry specification SGP.22). In some such embodiments, a CSG-ID is used as the enterprise identifier.

In some embodiments, eSIM Metadata is also used if the UE supports eUICC per GSMA SGP.22 and also implements handing of CSG-IDs per GSMA industry standard TS 1004. For eSIM use cases, the UE and LPA use the vendor specific extension from metadata and will discontinue the use of a CSG-ID as the enterprise identifier.

This requires an SMDP+ (Subscription Manager Data Preparation; Enhanced as compared to the SM-DP provided for in the industry standard SGP.02) in order to support the new metadata data structure. In some embodiments, the data structure is predefined as part of pLTE (private LTE) profile requirements. Alternatively, the data structure can be dynamically generated as needed by pLTE network profiles and at the time of actual delivery of an eSIM package (e.g., the "StoreMetadata" function per GSMA technology standard SGP.22).

It should be noted that in some embodiments, in addition to providing the enterprise identifier, the vendor specific extension is also used to provide additional information, such as enterprise deployment related information, which also includes information regarding geofencing of the campus, as well as network association and operating policies when the UE is connected to the enterprise network. In some embodiments, the information can be further extended to include other relevant information associated with the enterprise and enterprise credential as well.

In some embodiments, the following is a definition of a data structure in accordance with the disclosed method and apparatus:

---

ASN definition
-- ASN1START
VendorSpecificExtension ::= SEQUENCE OF SEQUENCE {
   vendorOid [0] OBJECT IDENTIFIER, -- OID of OnGO Alliance Or Network Provider
     vendorSpecificData [1] ANY DEFINED BY vendorOid – CBRS NID, Enterprise name, Enterprise Additional Data in TLV format.
}
-- ASN1STOP
Where
vendorSpecificData tag 0x99
CBRS NID - tag 0x80

-continued

Enterprise name - Tag 0x81
Enterprise Additional Data - Tag 0x82

---

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   a) defining an enterprise identifier for authentication of a UE (User Entity) device by an enterprise core network;
   b) using a protocol for storing the enterprise identifier as a vendor specific extension within a subscriber identification module (SIM) defined by a GSMA (Global System for Mobile Communications) industry specification
   c) assigning an enterprise identifier to the UE device without impacting a baseband implementation;
   d) receiving an OID (Object Identifier) at the UE device, which is a value;
   e) therein provisioning the enterprise identifier by providing the OID to the UE and associating the OID with the UE device for implementation within the UE device;
   f) the UE device determining a type of information specified in the vendor specific extension, based on the value of the OID; and
   g) a High Level Operating System (HLOS) obtaining, by vendor specific extension, the enterprise identifier without impacting the baseband implementation.

2. The method of claim 1, further comprising using the vendor specific extension as part of eSIM (embedded SIM) metadata.

3. The method of claim 1, further comprising using a predefined "stored metadata" function to provide profile metadata of the profile to an eSIM (embedded SIM).

4. A method comprising:
   a) defining an enterprise identifier for authentication of a UE (User Entity) device by an enterprise core network;
   b) using a protocol for storing the enterprise identifier as a CSG-ID (Closed Subscriber Group Identifier) within a subscriber identification module (SIM);
   c) assigning an enterprise identifier to the UE device without impacting a baseband implementation;
   d) receiving an OID (Object Identifier) at the UE device, which is a value;
   e) therein provisioning the enterprise identifier by providing the OID to the UE and associating the OID with the UE device for implementation within the UE device;
   f) the UE device determining a type of information specified in the vendor specific extension, based on the value of the OID; and
   g) a High Level Operating System (HLOS) obtaining, by vendor specific extension, the enterprise identifier without impacting the baseband implementation.

5. The method of claim 4, wherein the SIM is within a UE device that operates in accordance with LTE (Long Term Evolution) standards for storing CSG-ID values in a UE SIM.

6. A method comprising:
   a) defining an enterprise identifier for authentication of a UE (User Entity) device by an enterprise core network;
   b) using a protocol for storing the enterprise identifier as a NID (Network identifier) within a SIM (Subscriber Identity Module);
   c) assigning an enterprise identifier to the UE device without impacting a baseband implementation;
   d) receiving an OID (Object Identifier) at the UE device, which is a value;
   e) therein provisioning the enterprise identifier by providing the OID to the UE and associating the OID with the UE device for implementation within the UE device;
   f) the UE device determining a type of information specified in the vendor specific extension, based on the value of the OID; and
   g) a High Level Operating System (HLOS) obtaining, by vendor specific extension, the enterprise identifier without impacting the baseband implementation.

7. The method of claim 6, wherein the SIM is within the UE device that operates in accordance with NR (New Radio) standards for storing NID values in a UE SIM.

8. A UE (User Entity) device comprising:
   a) a SIM (Subscriber Identity Module) configured for storing a vendor specific extension; and
   b) a processor coupled to the SIM and configured to receive an enterprise identifier and to
      i. store the received enterprise identifier in the SIM as a vendor specific extension;
      ii. assign an enterprise identifier to a UE device without impacting a baseband implementation;
      iii. receive an OID (Object Identifier) at the UE device, which is a value;
      iv. therein, provisioning the enterprise identifier by providing the OID to the UE and associating the OID with the UE device for implementation within the UE device; and
   c) the UE device being configured to determine a type of information specified in the vendor specific extension, based on the value of the OID; and
   d) a High Level Operating System (HLOS), wherein implementing the instructions causes the processor to obtain, by the vendor specific extension, the enterprise identifier without impacting the baseband implementation.

9. A UE (User Entity) device comprising:
   a) a SIM configured for storing a CSG-ID (Closed Subscriber Group Identifier);
   b) a processor coupled to the SIM and configured to receive an enterprise identifier and to store the received enterprise identifier in the SIM (Subscriber Identity Module) as a CSG-ID;
   c) a memory storing one or more machine instructions, wherein implementing the instructions causes the processor to assign an enterprise identifier to a UE device without impacting a baseband implementation;
   d) wherein implementing one or more machine instructions that cause the processor to receive an OID (Object Identifier) at the UE device, which is a value; therein provisioning the enterprise identifier by providing the OID to the UE and associating the OID with the UE device for implementation within the UE device;
   e) wherein implementing the instructions causes the UE device to determine a type of information specified in the vendor specific extension, based on the value of the OID; and
   f) a High Level Operating System (HLOS), wherein implementing the instructions causes the processor to obtain, by the vendor specific extension, the enterprise identifier without impacting the baseband implementation.

10. The UE device of claim 9, wherein the UE device is configured to operate in accordance with LTE (Long Term Evolution) standards.

11. A UE (User Entity) device comprising:
   a) a SIM configured for storing a vendor specific extension;
   b) a processor coupled to the SIM (Subscriber Identity Module) and configured to receive an enterprise identifier and to store the received enterprise identifier in the SIM as a NID (Network identifier), the enterprise identifier being for authentication of a UE (User Entity) device by an enterprise core network;

c) a memory storing one or more machine instructions, wherein implementing the instructions causes the processor to assign an enterprise identifier to a UE device without impacting a baseband implementation;

d) wherein implementing one or more machine instructions that cause the processor to receive an OID (Object Identifier) at the UE device, which is a value, therein provisioning the enterprise identifier by providing the OID to the UE and associating the OID with the UE device for implementation within the UE device;

e) wherein implementing the instructions causes the UE device to determine a type of information specified in the vendor specific extension, based on the value of the OID; and f) a High Level Operating System (HLOS), wherein implementing the instructions causes the processor to obtain, by the vendor specific extension, the enterprise identifier without impacting the baseband implementation.

* * * * *